March 24, 1942.  P. SCHULTZE  2,277,458
DIFFERENTIAL DRIVING MECHANISM
Filed May 27, 1939  2 Sheets-Sheet 1
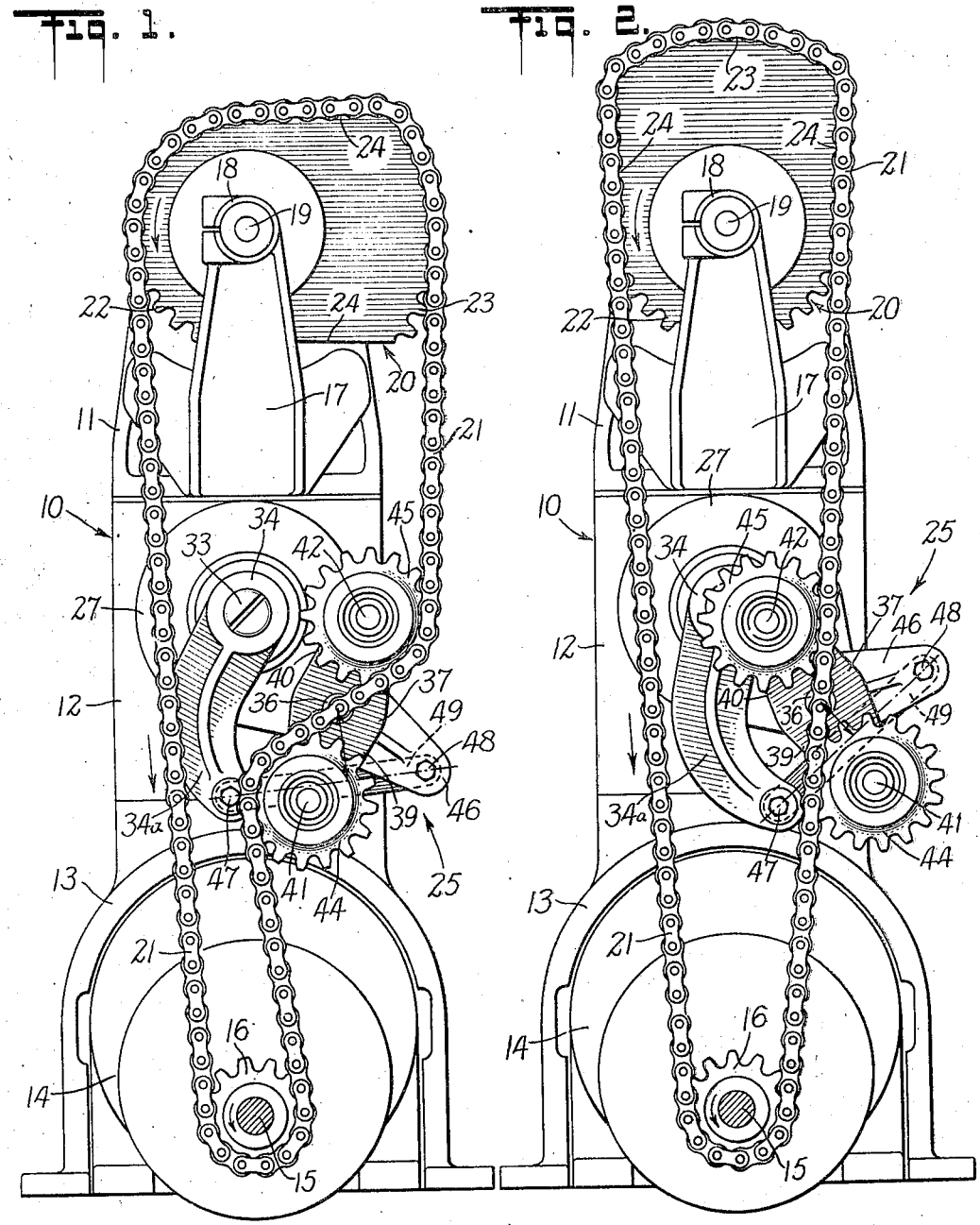
INVENTOR
Paul Schultze
BY
ATTORNEYS

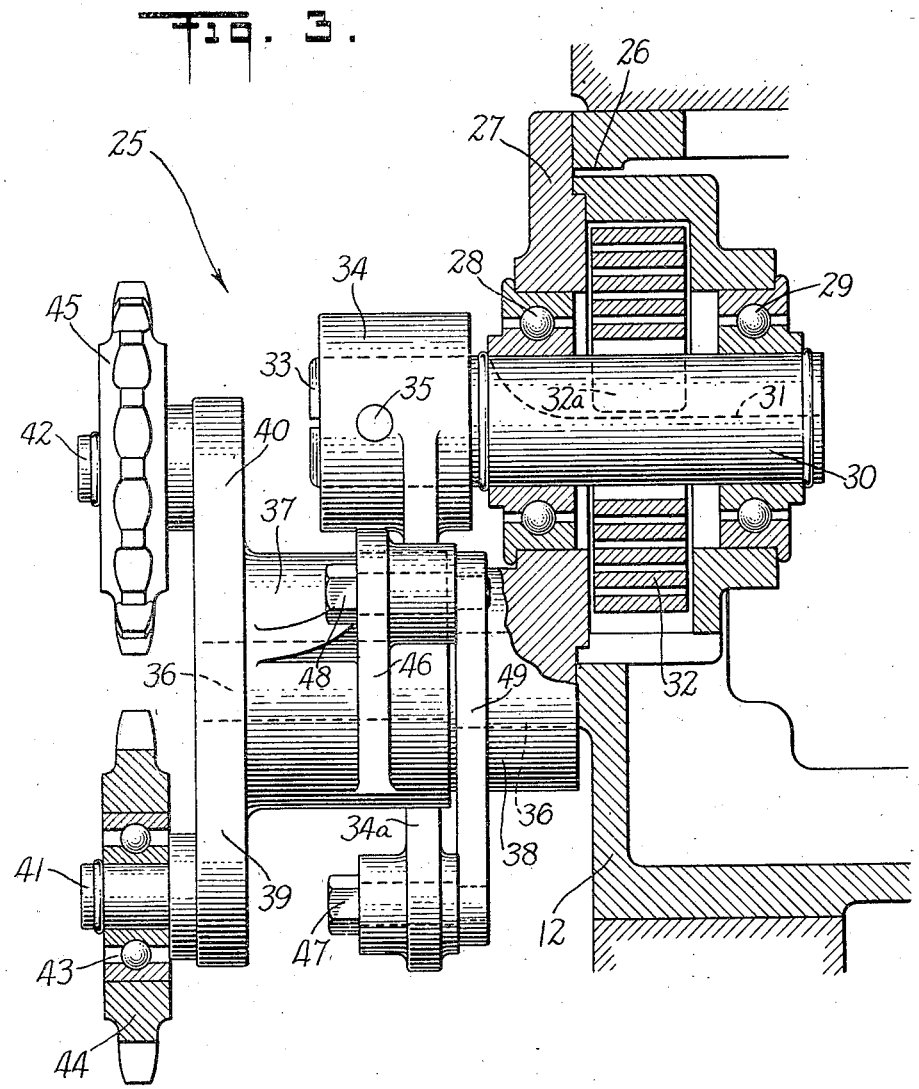

Patented Mar. 24, 1942

2,277,458

UNITED STATES PATENT OFFICE 2,277,458

DIFFERENTIAL DRIVING MECHANISM

Paul Schultze, Danbury, Conn., assignor to John C. Doran, doing business as Doran Brothers, Incorporated, Danbury, Conn.

Application May 27, 1939, Serial No. 276,039

2 Claims. (Cl. 74—216.5)

This invention relates to a machine element, and more particularly to a differential drive mechanism for a machine tool or the like.

One of the objects of this invention is to provide a differential speed drive which is simple and inexpensive in construction and yet thoroughly durable and reliable in operation. Another object is to provide mechanism of the above nature which is applicable to a variety of machine tools for facilitating the fabrication of work pieces of irregular peripheral contour. Another object is to provide differential speed drive mechanism characterized by driving and driven members connected by a flexible element, together with apparatus which maintains the flexible member in a taut condition. Other objects will be in part apparent and in part pointed out.

The invention accordingly consists in the features of construction, combinations of elements, and arrangements of parts as will be exemplified in the structure to be hereinafter described and the scope of the application of which will be indicated in the following claims.

In the accompanying drawings, in which is shown one of the possible embodiments of my invention, Figure 1 is a front elevation of the differential speed mechanism in one operative position;

Figure 2 is a view similar to Figure 1, but showing the mechanism in another operative position; and, Figure 3 is a fragmentary elevation, partly in section, of the idler apparatus shown in Figures 1 and 2.

Similar reference characters refer to similar parts throughout the various views of the drawings.

Various kinds of machine tools and similar apparatus require variable speed mechanism capable of imparting non-uniform rotation to the work piece being operated on. This is particularly true in the case of a work piece the peripheral contour of which is irregular and the work piece is being rotated for machining purposes. By reason of the irregular peripheral contour of the work piece, its circumferential velocity varies directly, as its different radii, although its R. P. M. is constant. This condition results in numerous difficulties, especially so where the machining operation is a delicate one, or where relatively high speed operation is desirable or where it is important that the peripheral speed of the work piece be maintained at a constant value.

While apparatus is available for imparting uniform circumferential velocity to certain types of non-circular bodies, such apparatus is generally complicated and expensive, and has practical limitations which confine its use to relatively few purposes. This type of apparatus is furthermore of little use where the machining operation is to be carried out on an asymmetrical work piece. Other disadvantages are inherent in such apparatus, and it is to the overcoming of these, in addition to those referred to, that my invention is directed.

Referring now to Figure 1 of the drawings, a machine tool is generally indicated at 10, and includes a head 11 mounted on the top of a column 12, the base 13 of which conveniently forms a housing for a motor or other prime mover 14. Motor 14 includes an armature shaft 15, on which is secured in any suitable manner a drive member 16, preferably a sprocket. A bracket or spindle support 17 is secured to head 11 in the machine, and includes at its upper end a journal 18 in which a spindle 19 is rotatably mounted. Spindle 19 has secured thereto a driven member, preferably a sprocket, generally indicated at 20, this sprocket being connected to drive sprocket 16 by a link chain 21. Under certain circumstances, the driving and driven members 16 and 20 may be pulleys connected by a flexible belt.

Illustratively, sprocket 20 includes a pair of arcuate toothed portions 22 and 23 disposed substantially at 180° from one another with respect to the axis of rotation of sprocket 20 which is the axis of spindle 19, the sides 24 of the sprocket preferably being plain, i. e. having no teeth formed therein. While toothed portions 22 and 23, as shown, are generated from the same axis, I do not intend to be limited to such a formation, as the peripheral contour of sprocket 20 may be any one of a wide variety, depending primarily upon the peripheral contour of the work piece which the machine tool is operating on. Thus, regardless of the contour of sprocket 20, it will be clear that a constant speed rotation of drive sprocket 16 will impart a varying rate of rotation to driven sprocket 20, but at the same time will maintain the circumferential velocity of sprocket 20 at a constant value. From this it follows that if there is mounted on spindle 19 a work piece the peripheral contour of which is substantially similar to that of sprocket 20, such work piece will rotate at a variable rate but at a constant circumferential velocity. Assuming such a work piece is being abraded peripherally, all portions thereof will receive uniform abrasion.

By reason of the irregular peripheral contour of driven sprocket 20, the slack in chain 21 will vary in accordance with the attitude of sprocket 20. As shown in Figure 1, there is a substantial amount of slack in chain 21, whereas in Figure 2, wherein sprocket portion 23 is at the top of its travel, there is but a slight amount of slack in the chain. To accommodate the slackness in the chain, and to maintain the tension thereof at a substantially constant value, I provide the slack adjuster mechanism which is generally indicated at 25 in Figures 1 and 2.

Referring to Figure 3, column 12 of machine 10 has an opening 26 formed therein which receives a mounting 27 adapted to support a pair of ball bearings or other suitable anti-friction devices 28 and 29, the inner races of which carry a stud 30 suitably slotted as at 31 to receive the inner end 32a of a coil spring 32. The outer end (not shown) of spring 32 is suitably attached to mounting 27.

Stud 30 includes an outer end 33 to which a hub 34 is attached by a set screw 35 or the like. Hub 34 and stub 30 swing or rock together, either against the bias of spring 32 or by reason of the bias of the spring. As shown in Figures 1 and 2, an arm 34a is preferably formed integrally with and extends from hub 34.

Still referring to Figure 3, I provide a stud or post 36 which extends from the side of column 12, and which rotatably or rockably mounts a hub 37 adapted to rotate about the axis of stud 36. Hub 37 is spaced from column 12 by a suitable spacer 38 to clear hub 34. Integrally formed with hub 37 are a pair of arms 39 and 40 extending in opposite directions and carrying respectively pivots 41 and 42, each adapted to receive a ball bearing such as that shown at 43 on pivot 41. These bearings rotatably mount idler sprockets 44 and 45 which are adapted to rotate about the axes of pivots 41 and 42. Hub 37 also has extending therefrom an arm 46 (Figures 1 and 2). The free ends of arms 34a and 46 are provided respectively with studs 47 and 48, to which are attached the opposite ends of a link 49, which thus links arms 34a and 46 together.

Spring 32 (Figure 3) is so arranged within mounting 27 as to bias stud 30, and accordingly arm 34a (Figure 1) in a clockwise direction. Thus, under the bias of spring arm 46, arms 39 and 40, and with them idler sprockets 44 and 45, tend to rotate about the axis of hub 37 in a clockwise direction. Hence, sprockets 44 and 45 which are respectively positioned on the outside and inside of chain 21 bear against and take up the slack in the chain. Maximum slack is present in chain 21 when sprocket portion 23 is at its bottom position, at which time the leverage exerted by arm 34a on arm 46 is at its greatest by reason of the fact that link 49 is displaced a maximum distance from the pivotal axis of arm 46. The least slack in chain 21 occurs when sprocket portion 23 (Figure 2) is at its uppermost position, wherein the power exerted by lever arm 34a is the least, by reason of the slight displacement of link 49 from the axis of arm 46.

It may now be seen that arm 34a is in effect a lever of the third order, whereas arm 46, together with arms 39 and 40 comprise a double angular lever of the first order, and by reason of the arrangement of these levers, and the relationship of one to the other, as afforded by link 49, the decreasing strength of spring 32 (Figure 3) which biases arm or lever 34a clockwise, is compensated for by the increasing mechanical advantage resulting from the displacement of link 49 from the pivotal axes of arms 39, 40 and 46. Thus, the mechanical advantage of lever 46 increases as the power of the spring decreases, with the result that the power output of lever 46 is maintained at a substantially constant value.

From the above, it will appear that idler sprockets 44 and 45 are constantly urged against the opposite sides of chain 21 with a uniform pressure, regardless of the amount of slack in the chain.

As many possible embodiments may be made of the above invention, and as many changes might be made in the embodiment above set forth, it is to be understood that all matter hereinbefore set forth or shown in the accompanying drawings is to be interpreted as illustrative and not in a limiting sense.

I claim:

1. In a drive mechanism for a machine tool which operates on a work piece of irregular peripheral contour, the combination with the driven spindle of such a machine of a driven sprocket secured to said spindle, a circular driving sprocket, and a power transmission chain connected to said sprockets, said first-mentioned sprocket having an irregular peripheral contour which corresponds substantially to the contour of the work piece whereby upon operation of the machine the work piece rotates at a substantially uniform circumferential velocity.

2. In a drive mechanism for a machine tool which operates on a work piece of irregular peripheral contour, the combination with the driven spindle of such a machine of a driven sprocket secured to said spindle, a circular driving sprocket, a power transmission chain connected to said sprockets, said first-mentioned sprocket having an irregular peripheral contour which corresponds substantially to the contour of the work piece whereby upon operation of the machine the work piece rotates at a substantially uniform circumferential velocity, and means for maintaining said chain taut.

PAUL SCHULTZE.